(12) United States Patent
Nilson

(10) Patent No.: US 6,989,620 B2
(45) Date of Patent: Jan. 24, 2006

(54) ELECTRIC MOTOR

(75) Inventor: Thord Agne Gustaf Nilson, Tyresö (SE)

(73) Assignee: Atlas Copco Airpower Naamloze Vennootschap, Wilrijk (BE)

( * ) Notice: Subject to any disclaimer, the term of this patent is extended or adjusted under 35 U.S.C. 154(b) by 0 days.

(21) Appl. No.: 10/491,437

(22) PCT Filed: Nov. 16, 2001

(86) PCT No.: PCT/BE01/00196

§ 371 (c)(1),
(2), (4) Date: Apr. 13, 2004

(87) PCT Pub. No.: WO03/055042

PCT Pub. Date: Jul. 3, 2003

(65) Prior Publication Data

US 2004/0251768 A1     Dec. 16, 2004

(51) Int. Cl.
*H02K 11/00*     (2006.01)

(52) U.S. Cl. .................. 310/254; 310/89; 310/164; 310/67 R

(58) Field of Classification Search ............... 310/254, 310/66, 67, 68 B, 156.01, 58, 105, 155, 156.08, 310/156.09, 156.11, 46, 54, 164, 67 R
See application file for complete search history.

(56) References Cited

U.S. PATENT DOCUMENTS

| 4,373,148 A | * | 2/1983 | Gutz | .......................... 318/254 |
| 6,570,275 B2 | * | 5/2003 | Kim et al. | .................... 310/12 |

* cited by examiner

*Primary Examiner*—Darren Schuberg
*Assistant Examiner*—Heba Elkassabgi
(74) *Attorney, Agent, or Firm*—Bacon & Thomas, PLLC

(57) ABSTRACT

The invention relates to an electric motor, in particular for high speed operation, comprising a motor housing (4); inside the housing (4), a stator (2) having a core (8) and windings (9) toroidally wound on the core (8); and a rotor (1) inside the stator (2). The motor comprises an inductance controlling ring (3) in soft-magnetic material around the stator core (8), increasing for each phase the leakage inductance and forming for each phase an integrated filter inducatnce (L1, L2, L3) outside the core (8) of the stator (2) but still inside the motor housing (4).

11 Claims, 3 Drawing Sheets

ELECTRIC MOTOR

BACKGROUND OF THE INVENTION

1. Field of the Invention

The present invention relates to an electric motor, in particular for high speed operation, comprising a housing; inside this housing, a stator having a core and windings toroidally wound on the core, with half-turns at the inside of the core and half-turns at the outside of the core; and inside the stator, a rotor.

2. Description of Related Art

In high speed motors the distribution of losses differs considerably from the distribution of losses in standard speed motors.

The speed of these high speed motors is commonly frequency controlled by an inverter. Due to harmonics coming from this inverter, the eddy current losses can easily become the dominant loss.

As these eddy current losses increase as the square of the design speed for the same frame size of the motor, these losses can be high compared with standard speed motors.

Moreover, as these losses have a tendency to be concentrated to the rotor, and cooling the rotor is most difficult, it is important to keep these eddy current losses as small as possible.

One known way to reduce these losses is to reduce the harmonic content from the inverter. This can be done by adding a filter between the inverter and the motor. In that way, the voltage supplied to the motor will have more the form of a sine wave.

If the eddy current losses are not magnitudes over what can be tolerated in the motor, said filter could be separate inductors outside the motor serially connected with said windings of said stator; those inductors need to be cooled, usually by means of convection cooling.

High speed motors are normally of very high power density and therefore often liquid cooled.

Separate standard convection cooled inductors outside the motor tend to be big and heavy for high power motors. They also add considerable cost to the drive system.

In a motor with toroidal windings, only the winding half-turns located at the inside of the core, facing the rotor, contribute to the generation of the main magnetic field and therefore to the generation of torque.

The stator winding half-turns at the outer side of said core generate a leakage flux and therefore form a part of the leakage inductance of the motor. This leakage inductance is not sufficient to reduce the harmonics due to inverter operation.

SUMMARY OF THE INVENTION

The invention seeks to provide a high speed electric motor which does not have the above mentioned problem and which is suitable for inverter operation.

Therefore, an electric motor according to the invention, comprises an inductance controlling ring in soft-magnetic material around the stator core, increasing for each phase the leakage inductance of the motor and forming an integrated filter inductance outside the core of the stator but still inside the motor housing, whereby between the stator core and the inductance controlling ring, there is a magnetic air gap. The thickness of this air gap determines the value of the integrated filter inductances formed by said ring, the stator core and the stator winding half-turns at the outside of the core. This air gap is carefully calculated when designing the motor.

The ring avoids leakage of the magnetic flux towards the outside, for instance towards the outer housing of the motor. Leakage flux may cause considerable eddy current loss in a steel housing.

The motor will be somewhat larger, but the integrated filter inductances can use the same cooling system as the rest of the motor. There is no need for a separate cooling system which would take much space and add cost.

To limit eddy current losses in the inductance controlling ring, the resistance of this ring in the axial direction of the stator should be high and therefore said ring is preferably laminated or from sintered material.

The motor may be liquid cooled with for example oil, in which case the stator may be housed in an internal housing in non magnetic material, for instance plastics, the inductance controlling ring surrounding this internal housing.

Preferably the motor has an outer housing, in which case the inductance controlling ring is preferably supported either directly or by the intermediary of supports by this outer housing.

BRIEF DESCRIPTION OF THE DRAWINGS

The invention will now be described by way of example and with reference to the accompanying drawings, in which.

DETAILED DESCRIPTION OF THE PREFERRED EMBODIMENTS

Figure 1:
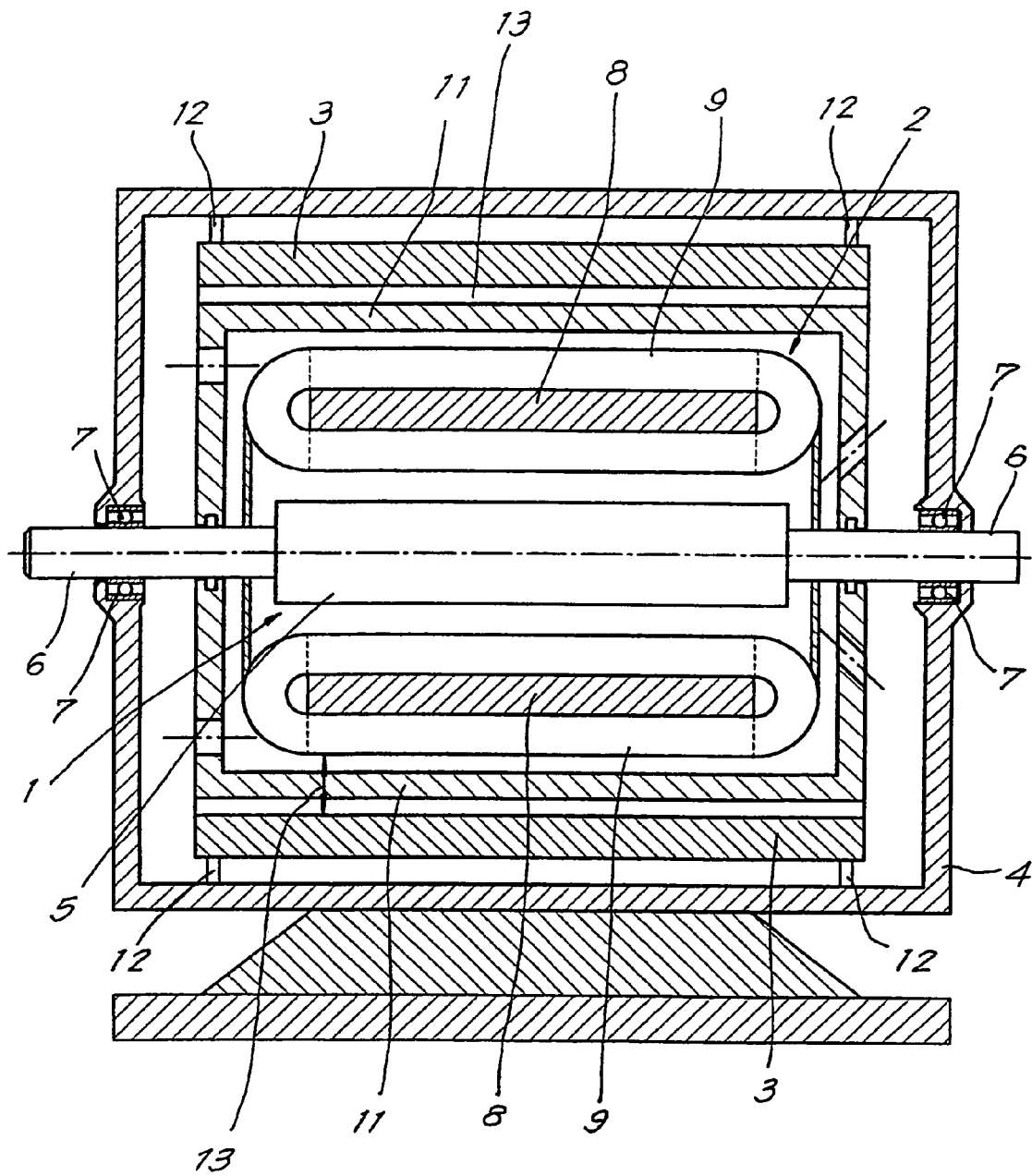
FIG. 1 represents a longitudinal section of a high speed electric motor, according to the invention.
Figure 2:
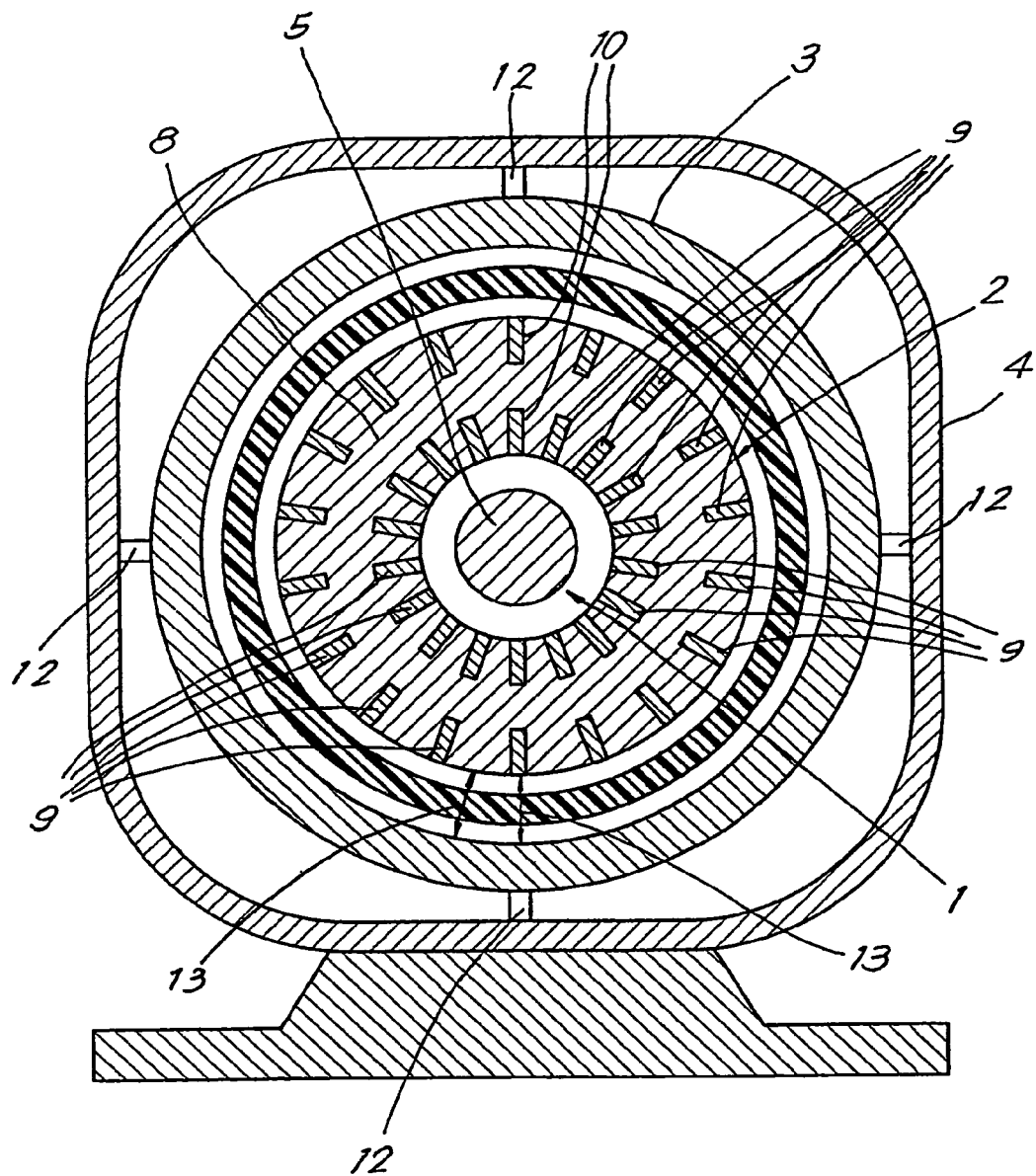
FIG. 2 represents a cross section of the motor of FIG. 1, with the outer housing partly cut away.

The motor shown in FIG. 1 is a three-phase permanent magnet synchronous A.C electric motor, comprising essentially a rotor 1, a stator 2 surrounding the rotor 1, an inductance controlling ring 3 surrounding the stator 2, and an outer housing 4.

The rotor 1 consists of a permanent magnet part 5 mounted on an axis 6, the end of which is supported in bearings 7 in the outer housing 4.

The stator 2 has a tubular core 8 and is provided with a number of stator windings 9 extending like rings around the core wall, with half-turns at the outside of the core 8 and half-turns at the inside of the core 8. The half-turns of the windings 9 are sunken in slots 10 in the core 8, although in another embodiment the windings 9 are not in slots.

For containing cooling oil, the stator 2 is also surrounded by an internal housing 11 in non-magnetic material, for example plastics.

The inductance controlling ring 3 is situated inside the motor, between the outer housing 4 and this internal housing 11.

This inductance controlling ring 3 is made from laminated steel or from sintered magnetic material.

The ring 3 is supported in the outer housing 4 by means of supports 12.

In some embodiments the supports 12 are omitted and the inductance controlling ring 3 is directly supported by the outer housing 4, as its outer surface contacts the inner surface of the outer housing 4.

In another embodiment the inductance controlling ring 3 is not situated between the internal housing 11 and the outer housing 4 but inside this internal housing 11.

The stator 2 may also be cooled by cooling air. In such embodiment, the inner housing 11 may be omitted.

In any way, a magnetic air gap 13 is formed between the core 8 of the stator 2 and the inductance controlling ring 3, the width of this gap 13 determining the value of the integrated filter inductance L1, L2 or L3 formed for each of the phases by portions of the ring 3 outside the core 8 and the half-turns of the stator windings 9 for a phase, situated at the outside the core 8.

Figure 3:
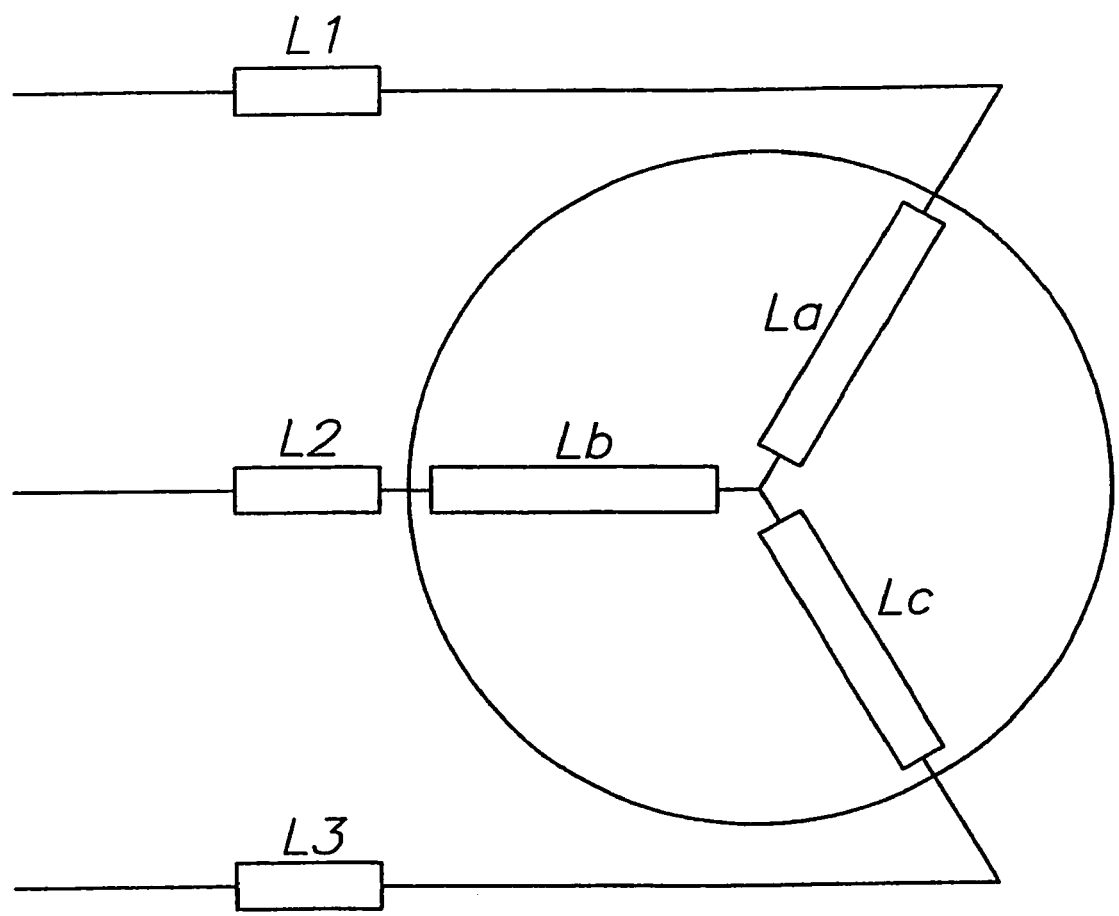
FIG. 3 schematically shows the simplified electric circuit for the three phase wound motor of FIGS. 1 and 2.

As shown in FIG. 3, each phase contains a number of windings 9 forming inherently conventional internal inductances La, Lb and Lc.

These conventional internal inductances La, Lb and Lc depend not only on the windings 9, but also on the geometry and the material characteristics of the material on the inside of the stator core 8, i.e. rotor characteristics and airgap 13.

Each conventional internal inductance La, Lb and Lc is in series with an integrated filter inductance L1, L2 or L3 formed by the ring 3 around the stator core 8, the stator core 8 itself and the winding half-turns for the phase situated at the outside of the core 8. These integrated filter inductances L1, L2 and L3 depend on the gap 13, the geometry and material characteristics on the outside of the stator core 8, and the saturation level of the stator core. The saturation level of said core 8 is normally kept low in order to minimise iron losses.

When the thickness of the air gap 13 decreases, the integrated filter inductances L1, L2 and L3 increase. Consequently, the air gap 13 is adjusted to the best compromise between a high integrated filter inductance for efficient reduction of inverter harmonics and additional iron losses in the inductance controlling ring 3.

When the motor is operated, there will be some iron losses and some eddy current losses. Compared to a standard high speed electric motor, the motor according to the invention will have some added iron losses, but substantially less eddy current losses, resulting in less total losses. In particular the rotor losses will be reduced.

The inductance controlling ring 3 may in an alternative embodiment be axially segmented.

In another alternative embodiment, the inductance controlling ring 3 coincides with the motor housing 4. The motor housing 4 is then made from soft-magnetic material, contrary to known motor housings.

The present invention is not limited to the embodiments described above and represented in the figures, but such high speed electric motor can have different embodiments and sizes, without leaving the scope of the invention as determined in the annexed claims.

What is claimed is:

1. Electric motor, in particular for high speed operation, comprising a motor housing; inside this housing, a stator having a core and windings toroidally wound on the core, with half-turns at the inside of the core and half-turns at the outside of the core; and a rotor inside the stator, said motor further including an inductance controlling ring made of soft-magnetic material around the stator core, increasing for each phase the leakage inductance and forming for each phase an integrated filter inductance outside the core of the stator but still inside the motor housing; and a magnetic air gap between the core of the stator and the inductance controlling ring, the thickness of this air gap determining the value of the inductances formed by said ring, the stator core and the stator winding half-turns outside the core.

2. Electric motor according to claim 1 wherein, in order to limit eddy current losses in the inductance controlling ring, the resistance of said ring in the axial direction of the stator is high.

3. Electric motor according to claim 2, wherein said ring is laminated or made from sintered material.

4. Electric motor according to claim 1, wherein the motor is liquid cooled and the stator is housed in an internal housing in non-magnetic material, for instance plastics, and wherein the inductance controlling ring surrounds said internal housing.

5. Electric motor according to claim 4, wherein the motor is liquid cooled, and the inductance controlling ring is placed inside said internal housing.

6. Electric motor according to claim 1, wherein the inductance controlling ring is supported either directly or by the intermediary of supports by the outer housing.

7. Electric motor according to claim 1, wherein the inductance controlling ring coincides with the housing.

8. Electric motor according to claim 7, wherein the inductance controlling ring is axially segmented.

9. Electric motor according to claim 1, wherein the windings of the stator are ring-like around the wall of the core.

10. Electric motor according to claim 9, wherein the windings of the stator are mounted in slots in the core.

11. Electric motor according to claim 1, wherein the motor is a permanent magnet synchronous AC motor.

* * * * *